United States Patent
Scott et al.

(10) Patent No.: US 11,869,087 B1
(45) Date of Patent: Jan. 9, 2024

(54) SYSTEM AND METHOD FOR TRADING SECURITIES USING PORTFOLIOS DEFINED BY AN ADVISOR

(71) Applicant: Charles Schwab & Co., Inc., San Francisco, CA (US)

(72) Inventors: James Scott, Parker, CO (US); Brandon Summers, Kansas City, MO (US); Kendall Houston, Clayton, NC (US); Yuriy Sakovich, Millbrae, CA (US); Christopher J. Zahner, Austin, TX (US)

(73) Assignee: Charles Schwab & Co., Inc., San Francisco, CA (US)

( * ) Notice: Subject to any disclaimer, the term of this patent is extended or adjusted under 35 U.S.C. 154(b) by 817 days.

(21) Appl. No.: 15/187,735

(22) Filed: Jun. 20, 2016

Related U.S. Application Data

(60) Provisional application No. 62/182,406, filed on Jun. 19, 2015.

(51) Int. Cl.
*G06Q 40/04* (2012.01)
*G06Q 40/06* (2012.01)

(52) U.S. Cl.
CPC .................... *G06Q 40/06* (2013.01)

(58) Field of Classification Search
CPC .............. G06Q 40/06; G06Q 40/04
USPC ............................................ 705/36 R
See application file for complete search history.

(56) References Cited

U.S. PATENT DOCUMENTS

| | | | | |
|---|---|---|---|---|
| 2011/0112985 A1* | 5/2011 | Kocmond | ............. | G06Q 40/06 705/36 R |
| 2011/0251978 A1* | 10/2011 | Davies | ................. | G06Q 40/00 705/36 R |
| 2014/0279701 A1* | 9/2014 | Farrow | ................. | G06Q 40/06 705/36 R |

\* cited by examiner

*Primary Examiner* — Hai Tran
(74) *Attorney, Agent, or Firm* — Harness, Dickey & Pierce, P.L.C.

(57) ABSTRACT

A system and method allows an advisor to identify allocations of investments and/or asset classes to each of several model portfolios in each of several investment strategies selected by the advisor, and to select asset classes to use and features to supply, as well as to select a primary and secondary investment to use for tax loss harvesting. Each of several investors is linked to an advisor and prompted with questions whose answers provide an initial assignment of the investor to an investment strategy from among those selected by the advisor to which the investor is linked and a model portfolio of that strategy, such initial assignment being capable of change from the investor in a limited fashion or the advisor in a broader fashion. Investments are made and redeemed and rebalancing occurs in accordance with the model portfolio of the investor and the allocations of the advisor for that model portfolio. Investments designated as other investments are not purchased in the normal course of purchasing nor are they rebalanced, at least until their value has dropped to the allocated percentage of the model portfolio.

18 Claims, 6 Drawing Sheets

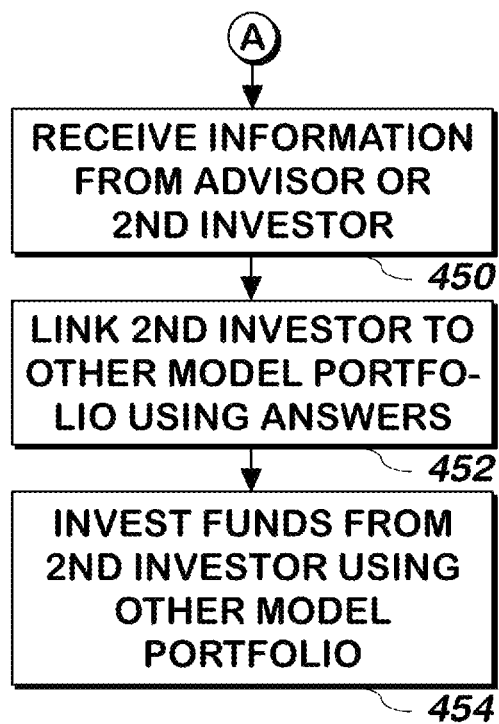

SYSTEM AND METHOD FOR TRADING SECURITIES USING PORTFOLIOS DEFINED BY AN ADVISOR

RELATED APPLICATIONS

This application claims the benefit of U.S. Provisional Patent Application Ser. 62/182,406 entitled, "Method and Apparatus for Trading Securities Using Portfolios Defined by an Advisor" filed by James Scott, Brandon Summers, Kendall Houston, Yuriy Sakovich and Christopher Zahner, filed on Jun. 19, 2015, and is related to U.S. Provisional Patent Application Ser. No. 62,113,956 entitled, "Method and Apparatus for Investing Using Investment Models Based on User Supplied Inputs" Filed by Christopher Zahner, Melody Burns, Nitin Barve and Mark Riepe on Feb. 9, 2015, and is related to U.S. Provisional Patent Application Ser. No. 62/099,150 entitled, "Method and Apparatus for Investing Using Investment Models Based on User Supplied Inputs" Filed by Christopher Zahner on Jan. 1, 2015, and is related to U.S. patent application Ser. No. 14/987,701 entitled "System and Method for Investing Using Investment Models Based on User Supplied Inputs" filed by Christopher Zahner, Melody Burns, Nitin Barve and Mark Riepe on Jan. 4, 2016 and each is hereby incorporated by reference in its entirety.

FIELD OF THE INVENTION

The present invention is related to computer software or hardware and more specifically to computer software and hardware for investing in securities. The foregoing should not be used to limit the scope of the invention, as the present invention is related to other areas as well.

BACKGROUND OF THE INVENTION

Investors invest in securities. Such arrangement is suboptimal. What is needed is a system and method for trading securities.

SUMMARY OF INVENTION

A system and method allows an advisor to register, receive a unique code, and specify investment strategies, asset classes to be used in investment strategies, features of some or all strategies, a primary ETF and secondary ETF for use in avoiding wash sales, and then specify the allocations of the asset classes specified to each of several model portfolios for each of the investment strategies, and/or allocations of investments to such model portfolios. Allocations of asset classes to each model portfolio may be specified via entering a numeric percentage of the total model portfolio for each asset class, or graphically, such as by dragging up or down boundaries separating bars representing any two asset classes of the model portfolio displayed on a stacked bar chart.

The advisor may adjust allocations of asset classes in each of several model portfolios for each of the several investment strategies. Such actions automatically adjust the allocations of investments in that asset class for that model portfolio for that investment strategy. The advisor may adjust the allocations of investments in an asset class for a model portfolio for an investment strategy, which adjust the allocation of the asset class for that model portfolio for that investment strategy.

The allocations specified by the advisor are checked for compliance with rules before they become part of the allocation of a model portfolio for an investment strategy. Rules may ensure that 1) each investment strategy contains a minimum number of model portfolios with different allocations of asset classes from one another, with minimum numbers of different allocations for different investment strategies, 2) the allocations of some or all asset classes in a model portfolio for an investment strategy fit within boundaries for the model portfolio and investment strategy, 3) adjacent model portfolios analyzed in a single direction from lowest index to highest, or vice versa, have an equal or increasing risk, and 4) the allocations of asset classes and investments sum to 100%.

An investor selects an advisor using the code provided to the advisor that the advisor provides to the investor or investors they will be advising as described herein, answers questions as described in the related applications, and is assigned an investment strategy, and model portfolio index for that investment strategy, based on the selections made by the advisor that the investor selected. The investor or advisor may manually adjust the index of the model portfolio, with the advisor allowed more leeway in such adjustment than the investor. Funds may be received or requested or rebalancing may occur automatically, and, in response, securities are bought or sold for the investor based on the allocations made by the advisor of model portfolio assigned or selected for that investor.

Some investments may be specified or automatically specified as "other investments." Such investments are not purchased when funds are added by the investor, nor are such investments rebalanced, but are sold in proportion with the investor's portfolio when the investor redeems the portfolio. In one embodiment, such investments are those whose allocations are reduced to zero or those purchased to avoid the wash sale rule. In another embodiment, such investments may include those whose allocations are reduced, and they are treated as described herein (only redeemed) until their value has dropped to correspond to the allocation, at which point they are no longer treated as other investments for that investor. The advisor may remove the designation that an asset is to be treated as an other investment, in which case the investment is rebalanced, including to zero, at the next rebalancing, which may occur periodically, such as monthly.

DETAILED DESCRIPTION OF A PREFERRED EMBODIMENT

Figure 1:
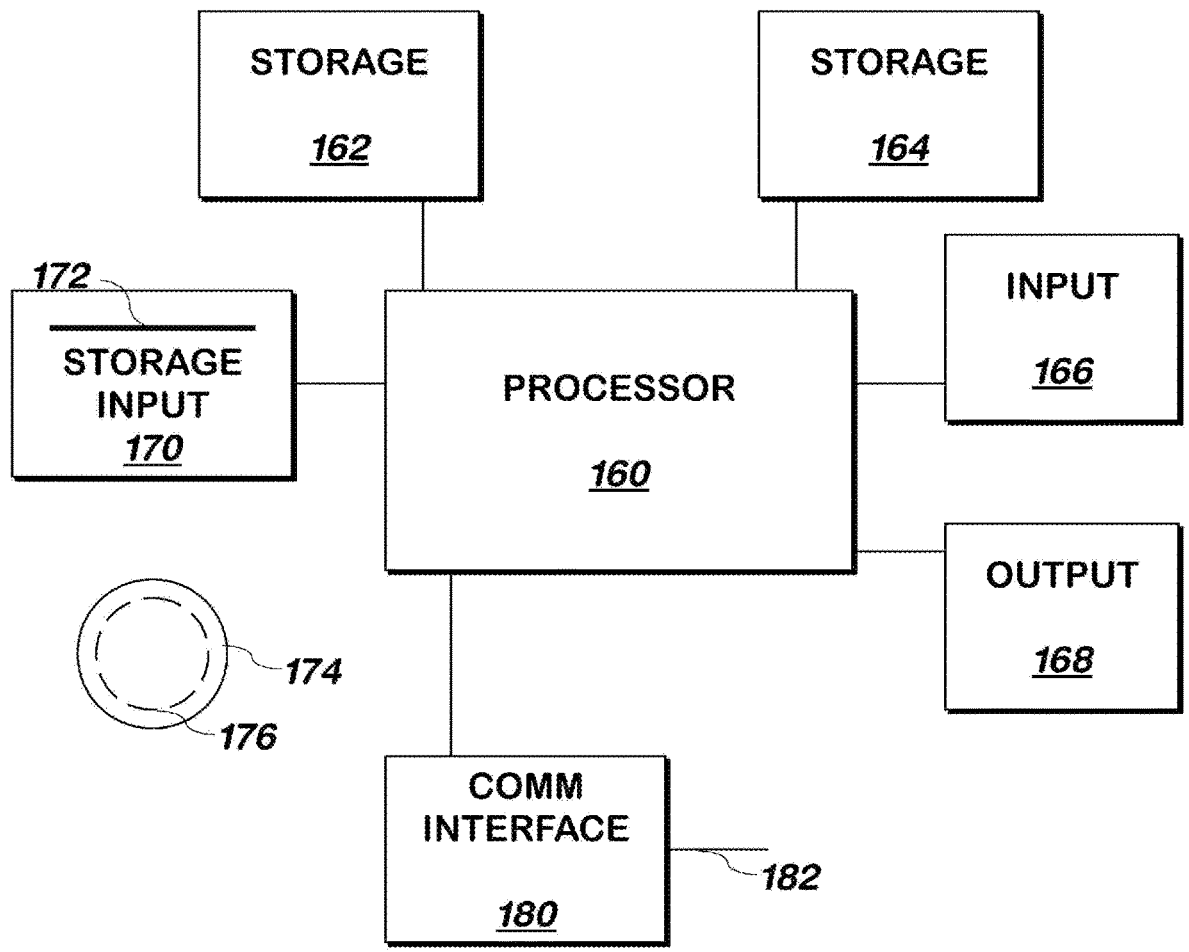
FIG. 1 is a block schematic diagram of a conventional computer system.

The present invention may be implemented as computer software running on a conventional computer system or as electronic hardware operating as described. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

The various storage devices 162, 164, 170, may be described as a storage system or memory system. Devices described below as "storage" may include memory or disk storage and may include a conventional database. All system elements include at least one input, one output and/or one input/output. All system elements are to be interpreted as structural: the only nonce word used herein is "means". System elements may include a processor system coupled to a memory system, logic circuitry that operates as described, mechanical systems, or other conventional arrangements.

In one embodiment, each computer system 150 is a conventional SUN MICROSYSTEMS SPARC ENTERPRISE M9000 SERVER running the SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as XT, VISTA or 7) commercially available from MICROSOFT Corporation of Redmond Washington or a Macintosh computer system running the MACOS or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a DROID 2 mobile telephone commercially available from MOTOROLA CORPORATION of Schaumberg, Illinois running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2A:
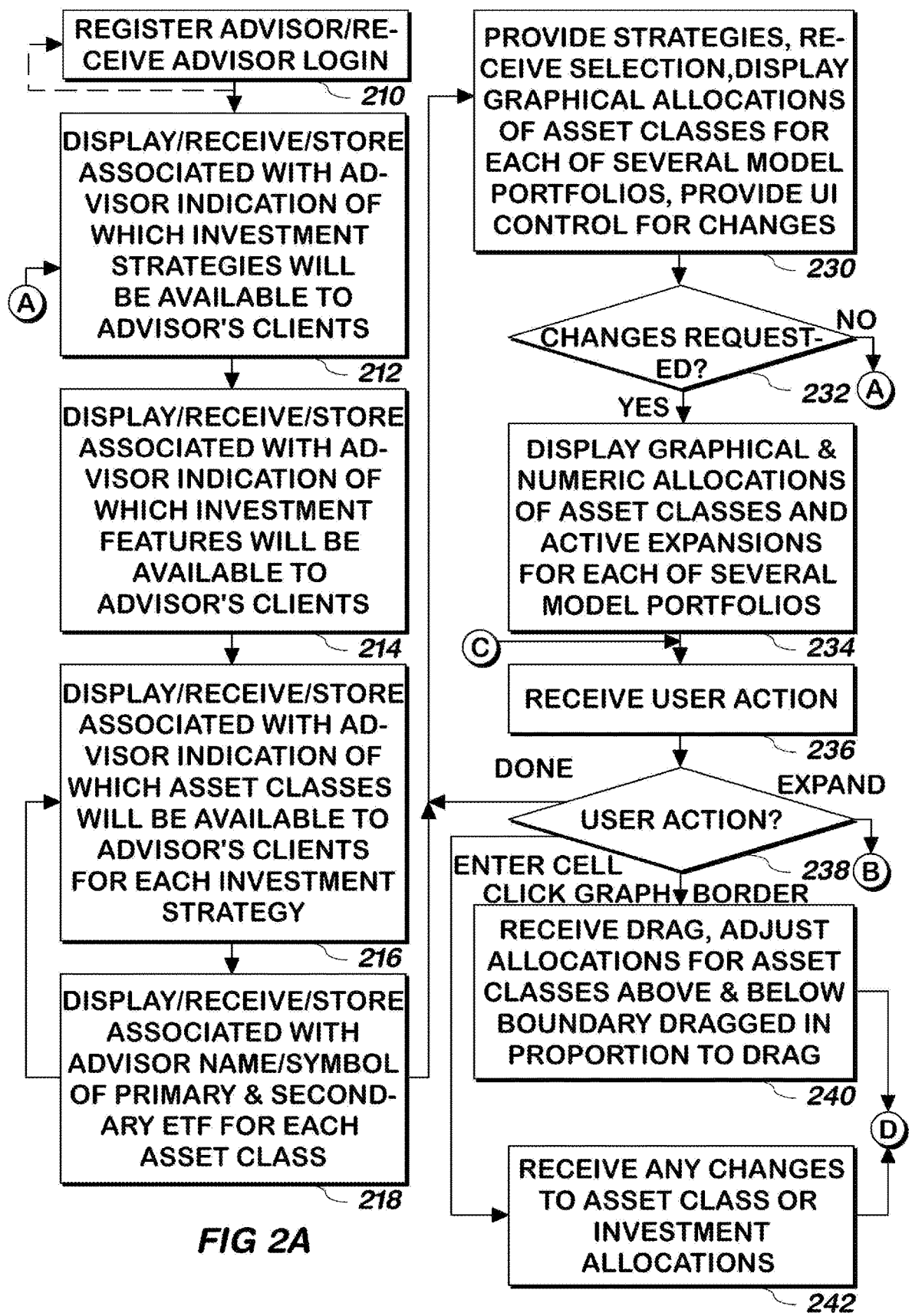
FIG. 2, consisting of FIGS. 2A, 2B and 2C, is a flowchart illustrating a method of trading securities according to one embodiment of the present invention.
Figure 2B:
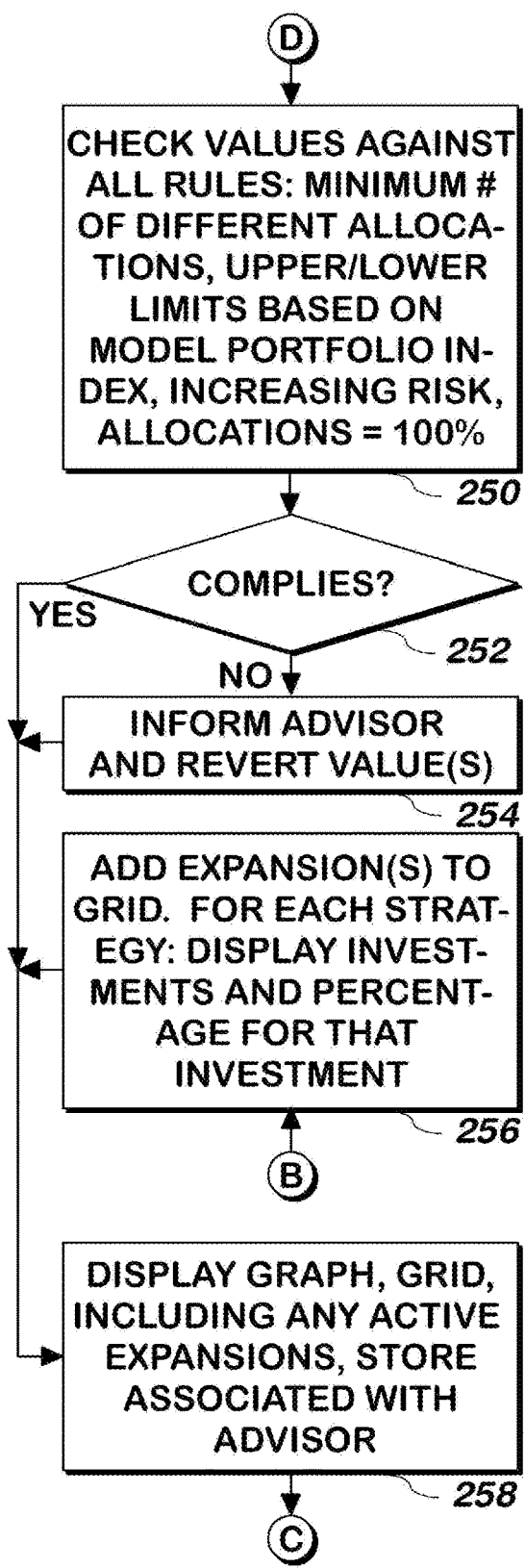
Figure 2C:
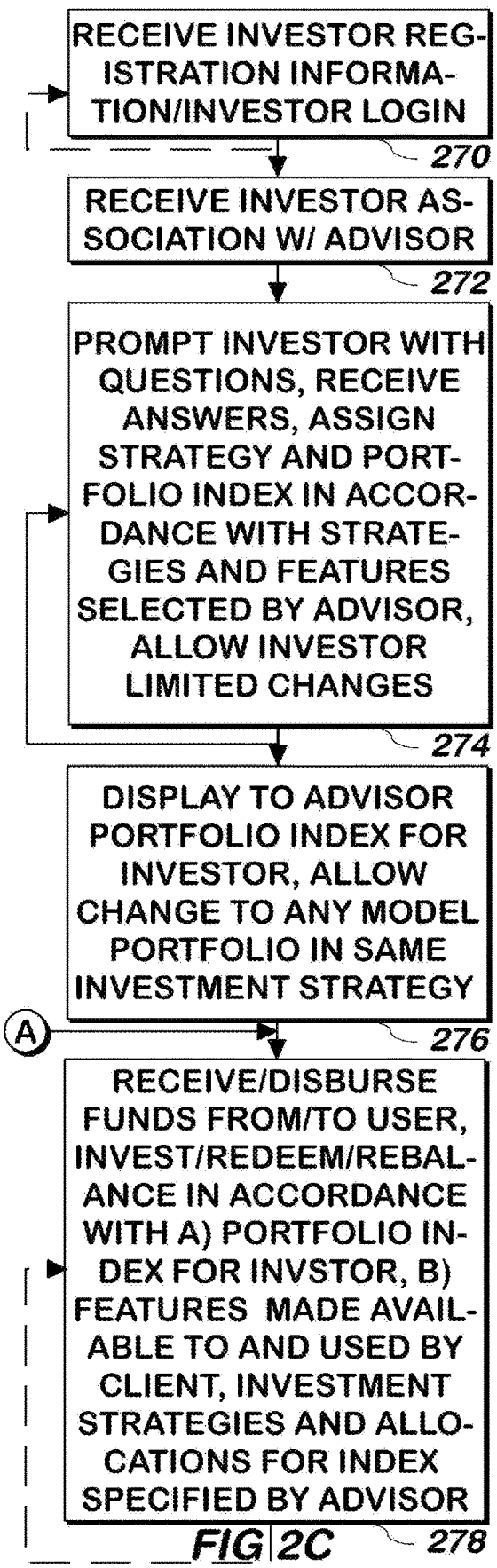

FIG. 2, consisting of FIGS. 2A, 2B and 2C, is a flowchart illustrating a method of trading securities according to one embodiment of the present invention.

Referring now to FIGS. 2A and 2B, a method of trading securities is shown according to one embodiment of the present invention. Multiple advisors are registered, for example by receiving identifying and other conventional registration information from them, issuing a unique identifier, and an advisor code, providing the code to the advisor (the code is provided to investors the advisor will advise as described herein) and storing all such information 210. Any number of advisors may be registered in this fashion. Advisors supply some of the identifying information to subsequently log in, using conventional techniques, also part of 210.

Following registration or login, a list of potential investment strategies are displayed to the advisor, and a selection of one or more of them is received and stored associated with the identifier of the advisor 212. The selection identifies the investment strategies that will be made available to the advisors clients as described herein. In one embodiment, there are four potential investment strategies, and the advisor may make one to four of them available to all of the advisor's clients. In one embodiment, the potential investment strategies are total return taxable, total return municipal, income taxable, and income municipal. The total return strategies attempt to provide a high level of total return, even if income is not the highest, while the income strategies attempt to provide a high level of income, even if it means sacrificing some total return. The municipal strategies include tax free funds, while the taxable funds do not. The various strategies are described in more detail in the related applications.

A list of investment features is displayed to the advisor with user interface controls to allow the advisor to indicate whether the features should or should not be made available to the advisor's clients, the indications are received from the advisor and stored associated with the identifier of the advisor 214. In one embodiment, the investment features correspond to the selections made in step 212, for example, including tax free funds of one or more states as one or more investment features, only if the advisor indicated to include a municipal investment strategy. Another investment feature includes conventional tax loss harvesting.

Each investment strategy selected by the advisor is listed with a list of possible asset classes, and the advisor is provided with a user interface control that allows the advisor to select asset classes that will be included in the strategy, and such selections are received and stored associated with the identifier of the advisor 216. For example, the asset classes may be listed to the left of rows of a grid, the investment strategies selected by the advisor may be listed on the top of columns of the grid, and the advisor may select or unselect user interface controls such as "X"s displayed in the grid to indicate whether or not to include or not include the asset class corresponding to the row in the investment strategy corresponding to the column. In one embodiment, municipal bond-related securities, such as municipal bond ETFs, are not included in the taxable strategies and at least one municipal bond-related security is required to be included in the municipal strategies. The asset classes listed may depend on the selections of features and/or investment strategies, for example, listing California tax free funds if the advisor indicated any of the municipal investment strategies should be made available in step 212 and California tax free funds should be an available feature in step 214.

Concurrently with step 216, the name and symbol of a primary and secondary ETF to be used for each asset class is displayed to the advisor if one was previously provided and otherwise the advisor is prompted to provide them, and any changes the advisor wishes to make to each such symbol for each asset class are received and stored associated with the identifier of the advisor 218. In one embodiment, the secondary ETF is used to avoid the wash sale rule, and otherwise the primary ETF is used for purchases and sales of the asset class. In another embodiment, the primary ETF is purchased in place of an investment allocated in the model portfolio assigned to the investor as described herein if the purchase of the investment would not avoid the wash sale rule, and the secondary ETF is purchased if purchases of the primary ETF would not avoid the wash sale rule.

In one embodiment, history information of the primary and secondary ETFs for the asset classes is stored associated with the advisor, and changes are stored associated with the date of the change, so that as ETFs for an asset class are changed, assets already purchased using the former ETFs assigned to the asset class may be used for sales of such assets, for example when rebalancing occurs. In another embodiment, the advisor may allocate an asset as an "other position" in an asset class, and any other position is held and not rebalanced, though it is also not used for purchases and/or redemptions. In one embodiment, such other positions are used for redemptions such that the same proportion of the other positions are redeemed as the remainder of the portfolio.

The advisor may move back and forth between steps 216 and 218, so as the advisor selects asset classes in step 216, the advisor may select primary or secondary ETFs for each asset class in step 218.

A list of the strategies the advisor selected as described above are provided and the advisor may select one of the strategies from the list 230. Each investment strategy (also referred to as a "strategy") is provided with a set of multiple model portfolios and either each model portfolio is initially assigned an allocation of the asset classes selected by the advisor as described herein or no such assignments are made, and such allocations may be modified by the advisor as described herein. The allocations of asset classes within each of several model portfolios for the selected strategy is graphically displayed with a user interface control that allows the advisor to indicate that the advisor wishes to view and/or make changes to one or more such allocations of the model portfolios 230. For example, a stacked bar chart may be displayed for each of the model portfolios that shows the allocations with in each such model portfolio of the various asset classes. Each model portfolio has allocated a percentage of each of the asset classes to that model portfolio, and different model portfolios may have different allocations of the asset classes. If the advisor uses the user interface control to indicate that the advisor wishes to view and/or make changes to one or more of the allocations of asset classes for one or more of the model portfolios 232, the method continues at step 234, and if the advisor indicates he or she does not wish to make further changes to the model portfolio 232, continues at steps 212 of FIG. 2A and step 268 of FIG. 2C.

At step 234, a graphical display of the model portfolios for the selected strategy is displayed with user interface controls to allow the allocations of asset classes within the model portfolios to be changed, as well as a grid of cells of those allocations in numerical form. The graphical display may be stacked bar charts, one for each model portfolio. The grid may be displayed as a column for each model portfolio in the selected strategy, displayed directly underneath the stacked bar graph of the model portfolio graphical display, using the same order, top to bottom, of asset classes as is used in the graphical display.

The advisor may then perform any of four different types of actions: adjust the allocations of asset classes within any of the model portfolios of the selected strategy via the graphical display, expand some or all of the asset classes by adding to the grid a list of investments for each asset class and the allocations of each investment to the asset class for each of the model portfolios for the selected strategy, adjust the allocations of asset classes within any of the model portfolios of the selected strategy or allocations of investments to any of the asset classes within any of the model portfolios of the selected strategy by clicking into the grid and changing one or more of the cells in the grid, or indicate that the advisor is done adjusting allocations of the model portfolios for that strategy, so that they may either adjust allocations for other strategies or indicate they are done with all such allocation adjustments.

To indicate that the advisor wishes to adjust the allocations of asset classes via the graphical display, in one embodiment, the advisor clicks onto a border separating two bars (each bar in a stack representing different asset classes of a model portfolio, with the size of each bar indicating the proportion of the total of that model portfolio allocated to the asset class corresponding to the bar) of the stacked bar chart representing the allocations of the asset classes within that model portfolio of the graphical display, and then drags that border up or down. A border is a divider between two different elements of the stacked bar chart representing one model portfolio of the selected strategy. If the advisor clicks on the border of the stacked bar chart 238, the advisor may then drag the border up or down, and the distance the border is dragged relative to the total height of the stacked bar chart is used to compute a proportional amount the user wishes to change the allocations of the two different asset classes corresponding to the bars of the stacked bar chart that share the border 240. The method continues at step 250 of FIG. 2B.

When initially displayed, the grid contains, for each model portfolio, the percentage of the portfolio allocated to each asset class listed in each row of the grid. If desired, the grid can be expanded to include the investments available in that asset class, and the percentage of the portfolio allocated to that available investment, where the available investments are listed in each row of the expanded portion of the grid. Each column in the grid corresponds to a different model portfolio, with the graphical display (i.e. the stacked bar chart) for the model portfolio displayed above the corresponding column. A user interface element such as a plus sign in a box is displayed near the name of the asset class in the original grid, and if the user operates the user interface control to expand the asset class into the grid 238, the investments available in that asset class, and the percentage of the total of the model portfolio allocated to that available investment, are added to an expanded area of the grid under the original grid, where the available investments are listed in each row of the expanded portion of the grid and the columns correspond to the different model portfolios 256 of FIG. 2B.

The graph, grid and any active expansions added to the grid are provided for display to the advisor 260, and the method continues at step 236. In one embodiment, expansion cells indicate the percentage of the portfolio represented by the investment corresponding to the cell. In one embodiment, an investment is an ETF, mutual fund or other security, as opposed to an asset class, which describes a type of investment.

If the advisor has changed the allocation of an asset class of a model portfolio as described above and herein, all the cells in the column for that model portfolio for the expanded portion of the grid representing that asset class are all adjusted on a pro rata basis to sum to the new allocation of the asset class. If the advisor changes a cell in the expanded portion of the grid, the change in the total allocation for the model portfolio corresponding to the column of the cell changed is also reflected in the cell in the same column (i.e. corresponding to the same model portfolio) corresponding to the allocation of the asset class that corresponds to the expanded portion of the grid that was changed (e.g. if a cell for an investment in the expanded portion of the grid is increased by the advisor from 2% of the model portfolio to 3% of the model portfolio, the cell corresponding to the allocation of that asset class is increased by 1% as well.

If the advisor clicks into the grid 238, the advisor may change one or more values in the cells of the grid, any changes to the allocations of asset classes within any of the model portfolios of the selected strategy or allocations of investments to any of the asset classes within any of the model portfolios of the selected strategy are received 242 and the method continues at step 250 of FIG. 2B.

In one embodiment, if the advisor clicks into the grid and hovers the mouse cursor over a cell of the grid, minimum and maximum allowable values for that cell, if any, are displayed to the advisor in a pop up fashion. The minimum and maximum values are described in more detail herein and below.

In one embodiment, if the advisor reduces an allocation of an investment from above zero to zero, and the investors of the client are holding such investment in their portfolio as indicated by records kept for each such portfolio, the advisor is prompted to classify the investment as an other investment. If the advisor indicates that the investment should be held as an other investment, the investment is considered as an other investment for investors associated with that advisor as described herein.

If the advisor indicates that he or she is done modifying the model portfolios in the current strategy 238, the method continues at step 230.

At step 250 of FIG. 2B, the changes made by the advisor are checked against rules for the components of the model portfolios. One rule ensures a minimum number of different allocations across all model portfolios for a strategy. For example, one model portfolio may have the same allocations as the next model portfolio. The various model portfolios in a strategy are indexed, P1, P2, P3 . . . etc., with the indices at the edges corresponding to different extremes in level of risk, and the risk associated with the various portfolios should be equal or increase as one analyzes portfolios sequentially in index order, or the reverse index order towards the direction of the portfolio with the highest risk. If an advisor were to adjust all of the portfolios to have an identical risk, the assignment of investors to model portfolios described herein would not be performed accurately. Thus, for example, the rule does not permit the advisor to circumvent this accuracy by assigning all of the model portfolios to have the same allocations. Although some model portfolios could have the identical allocations, the rule prevents fewer than a threshold number of different allocations across all model portfolios.

Another rule ensures that, when sorted by their indices P1, P2, etc., a risk of one model portfolio is equal to or greater than that of the adjacent model portfolio in the direction of the model portfolio at the edge with the highest risk, and/or lower than or equal to the adjacent model portfolio in the other direction. (As described herein, all model portfolios are assumed kept sorted by their index, low to high or high to low.) To perform this analysis, in one embodiment, the amount of a risky asset class in the model portfolio just altered by the advisor is compared to those in the model portfolio on each side of it to ensure it is equal to or higher in the direction of higher risk. In another embodiment, each asset class is assigned a risk score (the higher the risk for an asset class, the higher its risk score) and the score is multiplied by its allocation in a model portfolio, such products are summed within each model portfolio to produce a total risk score for the model portfolio, and the total risk scores of each model portfolio are compared to ensure compliance with the above rule, with the total risk score used to indicate the risk of the model portfolio.

Another rule ensures that the percentage allocated to each asset class in a model portfolio of an investment strategy falls within an range of percentages that is deemed acceptable for the asset class, the investment strategy, and the index of the model portfolio, with the range for asset classes more risky than average becoming wider for model portfolios corresponding to higher risk and narrower for model portfolios corresponding to lower risk, and the opposite ranges for asset classes less risky than average.

Another rule ensures the sum of the allocations of the asset classes and the investments within an asset class is 100 percent.

Some or all of the checks may be performed elsewhere in the method, for example, checking for totals of 100% after the advisor indicates he or she is finished changing allocations for an investment strategy.

If the change made by the advisor does not comply with all of the rules 252, the advisor is informed of the rule and its violation and the value of the cell is not changed to the new value specified 254: the value is either reverted to its prior value or the advisor may change it to a different value if the cursor remains in the cell, however, none of the rules may be overruled, so the advisor must change the cell to an acceptable value or it is reverted. The method continues at step 258 either using the reverted value or the new value that complies with all of the rules.

In addition to the actions described above, at step 258 the allocations of asset classes to model portfolios in the selected investment strategy and the allocations of investments to model portfolios for the selected investment strategy are stored associated with the identifier of the advisor.

The steps of FIGS. 2A and 2B may be performed for any number of advisors, each making their own specifications. Any number of advisors can each define their own model portfolios for each of several investment strategies using asset classes the advisor selects and including features the advisor selects. Selections not made are not included. Any or all of the information specified by an advisor as described herein may be different for each advisor, though default values may be specified for each such item, and many advisors may retain the default values, or some advisors may use the same or similar values as other advisors.

FIG. 2C continues the investing process using the information specified by advisors but adds the actions of investors. Referring now to FIG. 2C, conventional account and investor registration information is received from each of several investors including a username and password and other information conventionally received when opening an investment account, a unique investor identifier is assigned to each investor, and each investor may log in at any time using the username and password of the investor 270. The investor provides the advisor code received from the advisor as described above, the code is received and the identifier of the advisor corresponding to the code is associated with the identifier of the investor 272. Multiple investors may use the same advisor, though each investor may only select one advisor in one embodiment.

The investor is prompted with a number of investing-related questions described in the related applications. In one embodiment, questions relating to strategies not selected by the advisor the investor selected are not asked nor are answers received. In another embodiment, such questions may be asked and such answers may be received, but may not be used for the purpose of assigning a strategy 274. The strategy and model portfolio index is assigned as described in the related applications from among strategies selected by the advisor selected by the investor. The investor is shown the strategy and model portfolio assigned and is allowed limited manual changes to a different model portfolio in the same strategy as described in the related applications as part of step 274.

The investment strategy assigned to the investor, and the index of the model portfolio assigned to the investor selected by that investor, optionally as manually changed by the investor, is displayed to the advisor, along with the questions and answers. The advisor may manually reassign the model portfolio to the investor assigned to the investor as optionally modified by the investor, and the advisor may make such reassignment among any of the model portfolios for the strategy assigned to the investor 276, though in one embodiment not the strategy. In one embodiment, the advisor may not assign the investor to the model portfolio initially assigned to the investor if the investor manually reassigned out of such model portfolio. Any such reassignment by the advisor may be communicated to the investor, such as via an e-mail message. The strategy assigned, including any features, and the index of the model portfolio assigned, as modified by the investor or advisor, is stored associated with the investor identifier.

Any number of investors can thus have different combinations of a strategy, features and model portfolio of the strategy, stored associated with the investor identifier in this manner.

The investor may supply funds for investment, redeem funds or have the funds rebalanced using the asset class allocations and investment allocations within the asset class, as specified by the advisor for that investor in accordance with the strategy and model portfolio stored for the investor, as well as the features assigned, as specified by the advisor, or the investor may have his or her portfolio tax loss harvested using conventional techniques. Investing, rebalancing and tax loss harvesting, as well as redemptions, may be automatically performed in accordance with the model portfolio and strategy selected by the investor and optionally modified by the investor and/or the investor's advisor, as well as the advisor's specifications of allocations of the asset classes and/or investments that correspond to the model portfolio of the investment strategy.

In one embodiment, investments identified as "other investments" are only sold with redemptions, but are not rebalanced nor ordinarily purchased when a client adds funds, except those specified as primary or secondary ETFs, to avoid the wash sale rule as described herein. The amount of other investments sold is in proportion with the sale of investments currently in a model portfolio assigned to the investor. Thus, if a sale is requested for 10% of the investor's total portfolio including those allocated in the model portfolio assigned to the investor and the other investments held by the investor, 10% of the value of each other investment in the investor's portfolio are sold with 10% of the investments allocated to the model portfolio assigned to that investor. Purchases or rebalances will not be made using other investments. If an advisor does not specify an investment as an "other investment" and reduces the allocation to zero, the other investment will be sold at the next rebalancing.

In one embodiment, the advisor may specify the investment as an other investment when the percentage allocation is reduced, even if not to zero. Redemptions will include the other investment as described above, but only to the extent that the value of the other investment in the investor's portfolio exceeds the current allocation, at which point the investment will be treated like any of the investments in the investor's portfolio.

The wash sale rule is avoided as described herein as purchases are made by checking for losses on an investment in the last thirty days and not purchasing that investment, but purchasing the primary or secondary investment instead. In one embodiment, purchases of such investments are treated as other investments as described herein.

Thus, if the investor supplies funds for investment, the funds will be automatically invested by purchasing investments in the proportions specified by the advisor for the model portfolio and strategy stored for the investor. If the advisor has changed the investment allocations in the model portfolio, either by manually adjusting them or by pro-rata adjusting all of the investments in an asset class by adjusting the allocations of the asset class in the model portfolio for the investment strategy stored for the investor, the changes will be applied to the portfolio of investments held for the investor at the next rebalancing and subsequent investments, rebalances or redemptions will be made using the changes specified by the advisor. Some investors having the same advisor may have the same investment strategy and model portfolio. If the changes apply to multiple investors assigned the same advisor, the changes will be applied to all such investors. Whenever the investor or advisor changes the strategy and/or model portfolio for that investor, the investor's portfolio will be changed at the next rebalancing (which may be performed periodically, such as each month or each quarter) in accordance with the investments specified by the advisor in the changed model portfolio for the strategy.

The advisor and each investor are each different people, and each advisor is a different person from other advisors. Different investors are different people from other investors.

System.

Figure 3:
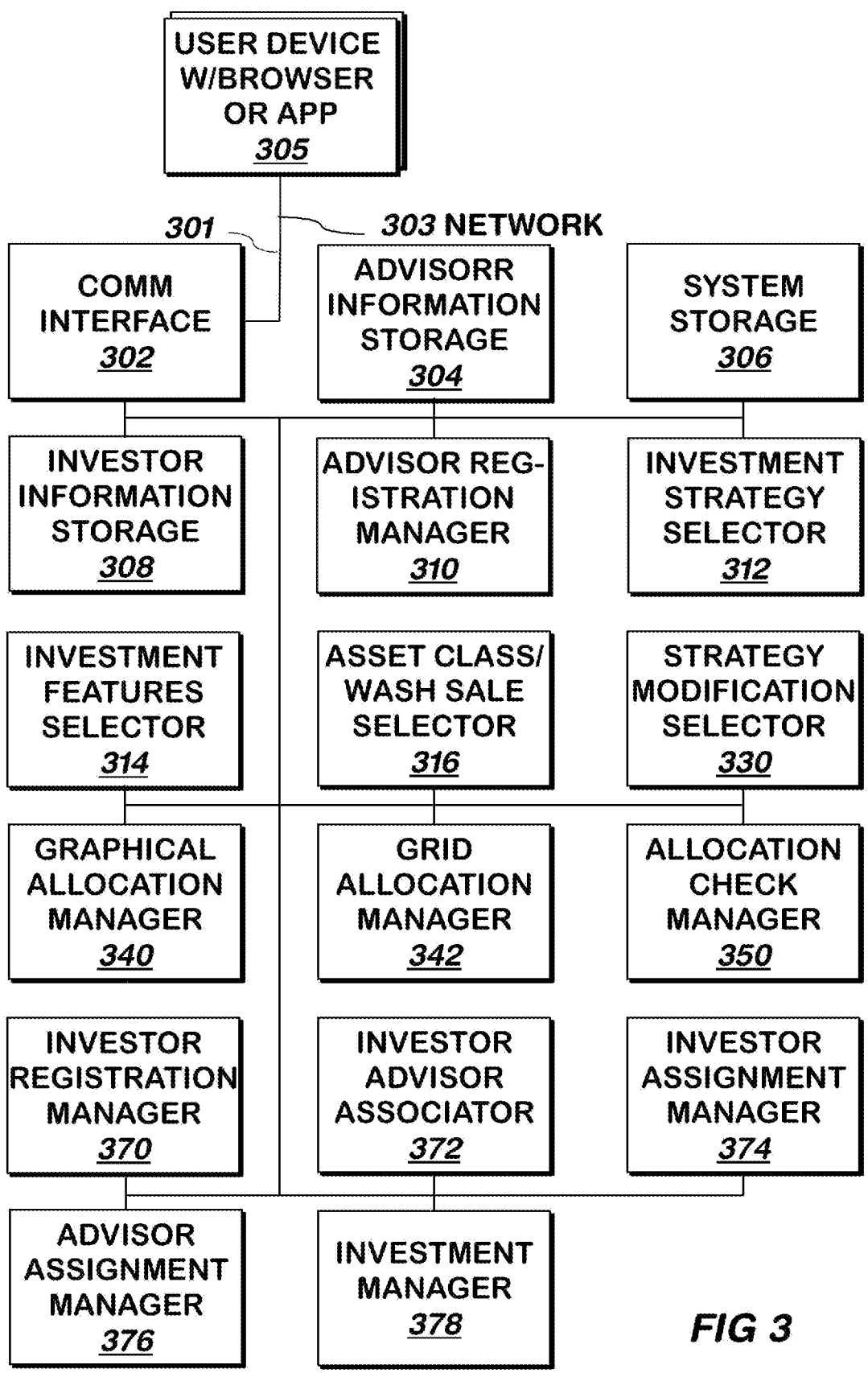
FIG. 3 is a block schematic diagram of a system for trading securities according to one embodiment of the present invention.

Referring now to FIG. 3, a system for trading securities is shown according to one embodiment of the present invention. The system of FIG. 3 operates as described herein.

Communication interface 302 includes a conventional TCP/IP-compatible communication interface running suitable communications protocols such as TCP/IP, Ethernet or both, and is coupled to a network such as an Ethernet network, the Internet, or both. Unless otherwise specified, all communication to and from the system of FIG. 3 is made via input/output 301 of communication interface 302, such input/output 301 is connected to a conventional network 303 such as an Ethernet network, the networks that make up the Internet, or both. Users communicate with the system of FIG. 3 via user devices 305, which may include any conventional computer system including smart devices running a conventional browser or application, operating as described herein. Components of the system illustrated outside user devices 305 may operate in part or in full on user devices 305, for example, as part of an application.

Referring now to FIG. 3, a system for making investments is shown according to one embodiment of the present invention. Advisor registration manager 310 receives from multiple advisors registration information and assigns a unique adviser identifier and provides to the advisor a unique advisor code, and stores such information into advisor information storage 304. Advisor registration manager 310 also allows advisors to log in to the system of FIG. 3 via conventional techniques. Once the advisor has registered or logged in, advisor registration manager 310 places a cookie on the advisor computer system used to log in, or uses other conventional techniques to allow subsequent identification of the advisor. An advisor may register or log in via a conventional browser, or a conventional application. The various elements of FIG. 3 can use such information to identify the advisor. Additionally, advisor registration manager 310 provides a user interface to advisors to allow the advisor to alter the information associated with the advisor as described herein. If the advisor operates the user interface, advisor registration manager 310 signals investment strategy selector 312 with the identifier of the advisor.

When signaled, investment strategy selector 312 provides for display to the advisor a list of the possible investment strategies and a user interface to allow the advisor to identify which investment strategies will be made available to the advisor's clients as described above. Investment strategy selector 312 receives indications of one or more the investment strategies that should be made available to the advisor's clients, stores the identifiers of such investment strategies into advisor information storage 304, associated with the advisor identifier of the advisor, and signals investment features selector 314 with the identifier of the advisor it received.

When signaled, investment features selector 314 provides for display to the advisor a user interface to allow the advisor to identify which investment features will be made available to the advisor's clients as described above, such as by providing a list of possible features with user interface elements to allow some or all of them to be selected. Investment features selector 314 receives indications of the investment features that should be made available to the advisors clients, stores the identifiers of such investment features into advisor information storage 304, associated with the advisor identifier of the advisor, and signals asset class/wash sale selector 316 with the identifier of the advisor.

When signaled, asset class/wash sale selector 316 provides for display to the advisor a user interface to allow the advisor to identify which asset classes will be available to the advisor's clients in each investment strategy, and the name and symbol of a primary and secondary ETF for each asset class, for each investment strategy having an identifier stored associated with the advisor identifier in advisor information storage 304 to indicate the advisor made such investment strategy available. Asset class/wash sale selector 316 receives indications of the asset classes that should be made available to the advisor's clients in each such investment strategy, and the name and symbol of the primary and secondary ETF for each such asset class as described above, and stores such identifier of asset classes associated with the identifiers of each investment strategy and symbols into advisor information storage 304, associated with the advisor identifier of the advisor, and signals strategy modification selector 330 with the identifier of the advisor it receives. In one embodiment, when investment strategy selector 312 receives a selection of the asset classes to make available by an advisor as described above, investment strategy selector 312 associates in advisor information storage 304 with the identifier of the advisor a default set of asset class allocations for each of the model portfolios in each investment strategy and associates a default set of allocations of investments with each asset class (including some investments which may be allocated as having a zero allocation), and in another embodiment, all allocations are initialized to zero, requiring the advisor to specify them all.

When signaled, strategy modification selector 330 lists the investment strategies for which identifiers are associated with the advisor as being available to the advisor's clients, and provides a user interface to allow the advisor to indicate that they wish to view or modify allocations for one such investment strategy, or that they did not wish to modify or further modify investment strategies at this time. When the advisor indicates that they do not wish to modify or further modify investment strategies, strategy modification selector 330 signals advisor registration manager 310 with the identifier of the advisor, and advisor registration manager 310 provides the user interface is provided as described above.

If the advisor uses the user interface provided by strategy modification selector 330 to select an investment strategy, and the advisor indicates that they wish to view and/or modify such selected investment strategy, strategy modification selector 330 provides the identifier of the advisor, and the identifier of the investment strategy selected to graphical allocation manager 340 and grid allocation manager 342.

When signaled, graphical allocation 340 provides for display to the advisor the allocations of asset classes to each of the model portfolios in the investment strategy it receives that are associated with the advisor identifier it receives, in advisor information storage 304. An allocation is a measure, such as a percentage of a total. Graphical allocation manager 340 provides for display to the advisor the graphical display of the allocations described above, for example using stacked bar charts, one for each model portfolio in the investment strategy. Graphical allocation manager 340 provides such graphical display with the user interface controls described above, to allow the advisor to drag up or down the boundaries between the elements of the stacked bar chart representing different asset classes as described above. Graphical allocation manager 340 then calculates newly-adjusted allocations of the two asset classes sharing the boundary that was dragged in proportion to the distance dragged, stores the newly-adjusted allocations, including, for each alteration, the investment strategy received, a proposed amount, identified as described herein, the index of the model portfolio, and the asset class or investment to which the proposed amount corresponds, in advisor information storage 304 associated with the identifier of the advisor, as well as the strategy identifier, without altering the existing allocations, and signals allocation check manager 350 with the identifier of the advisor and the strategy identifier it received.

When signaled, grid allocation manager 342 provides for display to the advisor the allocations of asset classes to each model portfolios and investment strategy it receives that are associated with the advisor identifier it receives, in advisor information storage 304 using a grid of allocations that appears similar to a conventional spreadsheet. The grid is displayed simultaneously, or on a single screen, the graphical display, or may be separately displayed. Grid allocation manager 342 also displays user-interface controls to allow the advisor to cause grid allocation manager 342 to display, as grid expansions, the allocations of investments to one or more asset classes, where the allocations are displayed and entered as a percentage of the total model portfolio, using a similar spreadsheet-like format. Grid allocation manager 342 receives from the advisor adjustments to cells in the grid, or grid expansions, stores the newly-adjusted allocations including, for each alteration, a proposed amount received from the advisor, the index of the model portfolio, the investment strategy received, and the asset class or investment to which the proposed amount corresponds, in advisor information storage 304 associated with the identifier of the advisor, as well as the strategy identifier, without altering the existing allocations (but displaying the newly adjusted allocations in their place) and signals allocation check manager 350 with the identifier of the advisor and the investment strategy identifier it received. Grid allocation manager 342 displays the investment allocations in any expansion of the grid for an asset class whose allocation is adjusted in accordance with the newly-adjusted allocations stored in advisor information storage 304, for example, by multiplying the allocations of investments to asset classes by the newly adjusted allocation of that asset class and dividing by the existing allocation of that asset class for each investment in the asset class.

If an advisor reduces in an expansion the allocation of an investment from above zero to zero and such investment has been purchased for investors corresponding to that advisor and are still held by them, grid allocation manager 342 supplies a user interface element to the advisor to ask whether the advisor wishes to classify the investment as an other investment. If so, an identifier of the investment is stored in advisor information storage 304 in a list of other investments by grid allocation manager 342. If the advisor later increases the allocation of such investment above zero or removes the classification of the investment as an other investment, via a user interface provided by grid allocation manager 342, grid allocation manager 342 removes the identifier of the investment from the list.

Grid allocation manager 342 identifies or receives from an operating system (not shown) on user system 305 or browser on user system 305 one or more indications that indicate the user has clicked in the grid and is hovering a mouse cursor or other pointer over a cell, and receives an indication of the position that grid allocation manager 342 resolves to a cell of the grid. Grid allocation manager 342 looks up in system storage 306 any upper or lower bound corresponding to that cell and displays it as described herein.

When either graphical allocation manager 340 or grid allocation manager 342 stores any newly adjusted allocation value into advisor information storage 304, each signals the other with the identifier of the advisor, the investment strategy it received, and a parameter that indicates that the newly adjusted values should be displayed, to allow it to update its display, as described herein, so that the two displays are consistent with one another, and show any newly-adjusted allocation or allocations, including adjusting any expansion grid being displayed as described herein.

When signaled with the identifier of the advisor and the strategy identifier, allocation check manager 350 locates the newly-adjusted allocations and tests them as if they had been substituted in place of the corresponding existing allocations, for compliance with the rules as described above. Where a newly-adjusted value was received, that value is substituted for the existing value, and existing values are used where no newly-adjusted value is received. All values used are those for the advisor corresponding to the identifier received by allocation check manager 350, except for thresholds described herein and below, which are applicable to all advisors.

To test for totals of 100%, allocation check manager 350 sums the allocations of asset classes and/or allocations of investments for each model portfolio of the strategy whose identifier it receives that contains newly-adjusted allocations and compares them to 100. To check for a minimum number of allocations, in one embodiment, allocation check manager 350 builds, for each model portfolio, a number that contains the two digit (rounded to the nearest whole number) allocations of each asset class next to one another by multiplying the first allocation by 1, multiplying the second allocation by 100, multiplying the third allocation by 10000 and so on, then summing the products within each single model portfolio, treating any allocation over 99 percent as 99. Allocation check manager 350 then identifies the number of unique numbers that result from such sums from each model portfolio. To test for the allocations within upper and lower limits, allocation check manager 350 checks the newly-adjusted allocations to ensure they are between corresponding upper and lower bounds for asset classes or investments stored in system storage 306 for each asset class and/or investment for the received investment strategy and optionally for each model portfolio index, in which case the proper upper and lower bound is located by allocation check manager 350 for the asset class, investment strategy and/or investment, and optionally for the index corresponding to each newly-adjusted allocation. To test for increasing risk allocation check manager 350 uses any of the manners described above, by comparing the risk for model portfolios where the newly adjusted allocations are substituted for existing values, with the risk of the neighbor model portfolios where the newly adjusted allocations are substituted for existing values, for each model portfolio for the investment strategy corresponding to the identifier received, measured as described above.

If any of the above tests fail, allocation check manager 350 provides for display to the advisor, an explanation of the problem causing the test to fail, and identifies the value or values causing it, for each of one or more problems, and may suggest measures that the advisor can perform to remediate the problem. Allocation check manager 350 signals graphical allocation manager 340 and grid allocation manager 342 with the identifier of the advisor and the strategy, and the parameter that indicates that the newly adjusted values should be redisplayed. Graphical allocation manager 340 and grid allocation manager 342 operate as described above, but continue to substitute the newly adjusted values in the display in place of the existing values. If the advisor indicates that he or she is done adjusting values for the investment strategy without making changes to correct the problem or problems, the newly adjusted values are discarded by allocation check manager 350, without changing the existing values, which will then be used in a subsequent display. (If the model portfolios are used for investment purposes as described herein and below while a newly-adjusted value is stored in advisor information storage 304, the newly adjusted values are ignored and only the existing values are used.)

If none of the above tests fail, allocation check manager 350 replaces in advisor information storage 304 the allocations of investments to asset classes with the existing allocation of that investment multiplied by the newly-adjusted value of the asset class, divided by the existing allocation of the asset class for each investment in any asset class having a newly-adjusted value, replaces the existing allocations with the corresponding newly-adjusted allocation for the allocations for the investment strategy and the advisor having the identifiers it received, deletes the newly-adjusted allocation stored separately from the existing allocation, and signals graphical allocation manager 340 and grid allocation manager 342 with the identifiers of the advisor and the strategy. Graphical allocation manager 340 and grid allocation manager 342 redisplay the allocations so updated, including any expansions, as described above. Following any redisplay, the advisor may make adjustments to allocations as described herein.

In one embodiment, allocation check manager 350 can omit performing some or all of the checks described above for some or all advisors. An advisor identifies to allocation check manager such checks not to be performed, or system administrator identifies to allocation check manager 350 an advisor and the checks not to be performed for such advisor, and allocation check manager 350 internally stores the identifier of the advisor and indications of the check or checks that should not be performed, and omits performing such check for such advisor at such time as the checks would have been performed when it receives the identifier of any such advisor.

Graphical allocation manager 340 displays, in addition to the graphical display, a user interface control that allows the advisor to indicate that the advisor is done modifying or reviewing allocations to the model portfolios in the investment strategy. If the advisor indicates that he or she is done modifying or reviewing allocations for the selected strategy, graphical allocation manager 340 signals strategy modification selector 330 with the identifier of the advisor. The advisor may then use a user interface provided by strategy modification selector 330 to select a different investment strategy and repeat the process of reviewing and optionally modifying the allocations for that strategy, for any number of strategies, or to indicate that they are finished reviewing and optionally modifying strategies as described above.

At any time, an investor may use investor registration manager 370 to register as an investor as described above, including providing a username and password, and investor registration manager 370 issues a unique identifier to the investor and stores it with the information received into investor information storage 308. Investor registration manager 370 signals investor advisor associator 372 with the investor identifier.

When signaled, investor advisor associator 372 provides a user interface to allow the investor to enter the advisor code supplied to the investor by the advisor. Investor advisor associator 372 stores the advisor code associated with the investor identifier in investor information storage 308 which associates the advisor with the investor. Investor advisor associator 372 signals investor assignment manager 374 with the identifier of the investor.

When signaled, investor assignment manager 374 prompts the investor with questions, receives and stores the answers, scores the answers and identifies the investment strategy, features and model portfolio based on the answers as described herein and in the related applications from those specified and/or made available by the advisor corresponding to the advisor code as described herein. In one embodiment, questions only relating to investment strategies or features that are not specified as being available by the advisor associated with the investor being questioned are not asked, nor are answers received, by investor assignment manager 374

Investor assignment manager 374 displays information about the investment strategy identified and the model portfolio identified and allows the investor to change the model portfolio identified to a limited extent as described in the related application, stores an identifier of the investment strategy and features and model portfolio index initially identified and any change made by the investor to the model portfolio index into investor information storage 308 associated with the identifier of the investor it received, and marks the investor identifier as requiring review by the advisor.

When the advisor logs in using advisor registration manager 310, advisor registration manager 310 provides the advisor code of the advisor stored in advisor information storage 304 to advisor assignment manager 376. For each investor in investor storage 308 having the advisor code associated therewith, and that is marked as requiring review by the advisor, advisor assignment manager 376 provides a user interface to the advisor that displays the name of the investor, the investment strategy, features and model portfolio identified and any change made to the model portfolio index by the investor, and optionally the questions and answers, and the allocations made to the model portfolio identified for the investor and the other model portfolios, and allows the advisor to change the model portfolio index identified for the investor, or keep the one changed by the investor or identified by investor assignment manager 374. Advisor assignment manager 376 receives from the advisor the selection of the model portfolio index and stores the model portfolio index assigned to the investor into investor information storage 308, with the index selected by the advisor being assigned, or if no changes were selected by the advisor, the index changed by the investor being assigned, or if no changes were made by the investor, the index identified by investor assignment manager 374 being assigned to the investor. If the advisor changed the index of the model portfolio, the advisor may also supply notes as to why the change was made and such notes are stored associated with the investor identifier in investor information storage 308.

At the next investor login, investor registration manager 370 checks to see if the model portfolio index assigned to the investor is different from the one changed by the investor or if no changes were received from the investor, different from the one identified by investor assignment manager. If such differences are identified, investor registration manager 370 displays a notification to the investor with the change and information about the model portfolio assigned and the one changed by the investor or if no changes were made by the investor, the one identified by investor assignment manager 374, along with the notes for the change.

Contributions are received from the investor and redemptions paid out to the investor. For each such redemption or contribution, an amount, investor identifier and indication as to whether the transaction is a contribution or redemption is received by investment manager 378. Investment manager 378 purchases or sells the investments via conventional markets or using other conventional techniques as indicated by the allocations for the investment strategy, features and model portfolio index stored with that investor identifier in investor information storage and the allocations of investments specified by the advisor for that investment strategy stored in advisor storage 404 for the advisor having the advisor code in advisor information storage 404 that is stored associated with the investor in investor information storage 408. As securities are purchased or sold as described herein, investment manager 378 maintains in investor information storage 308 for each investor the symbol and quantity for each investment held by the investor.

Periodically, investment manager 378 rebalances the investor's portfolio for each of the investors who are using the system of FIG. 3 by identifying the allocation of investments to use for that investor as described immediately above and herein, checking with a conventional price quotation server (not shown) to identify the value of the investments held by that investor (by multiplying the price of the investment by the number of shares held by that investor), summing the values, and comparing the actual allocations of investments in the portfolio to those specified by the model portfolio of that investor and the investor's advisor. Investments with allocations of value higher than that specified by such model portfolio are sold and investments with allocations of value lower than that specified by such model portfolio are purchased using conventional techniques. The wash sale rule is avoided by investment manager 378 using the primary and secondary ETFs for each asset class as described herein. Any "other investments" in an asset class indicated in advisor information storage 304 are handled by investment manager 378 as described herein.

If the advisor changes an allocation to a model portfolio, the process above will be followed and so the change will take effect at the next transaction or rebalancing of the investor's portfolio. If the investor or advisor changes the model portfolio index of the investor to a different model portfolio index, or to a different strategy and model portfolio index of that new strategy, the process above will be followed and so the change for an investor will take effect at the next transaction or rebalancing of the investor's portfolio. If the investor assigns a different advisor, the process above will be followed and so the change will take effect at the next transaction or rebalancing of the investor's portfolio.

Any number of investors may trade securities in this fashion using any number of advisors.

Sample Operating Examples

Figure 4A:
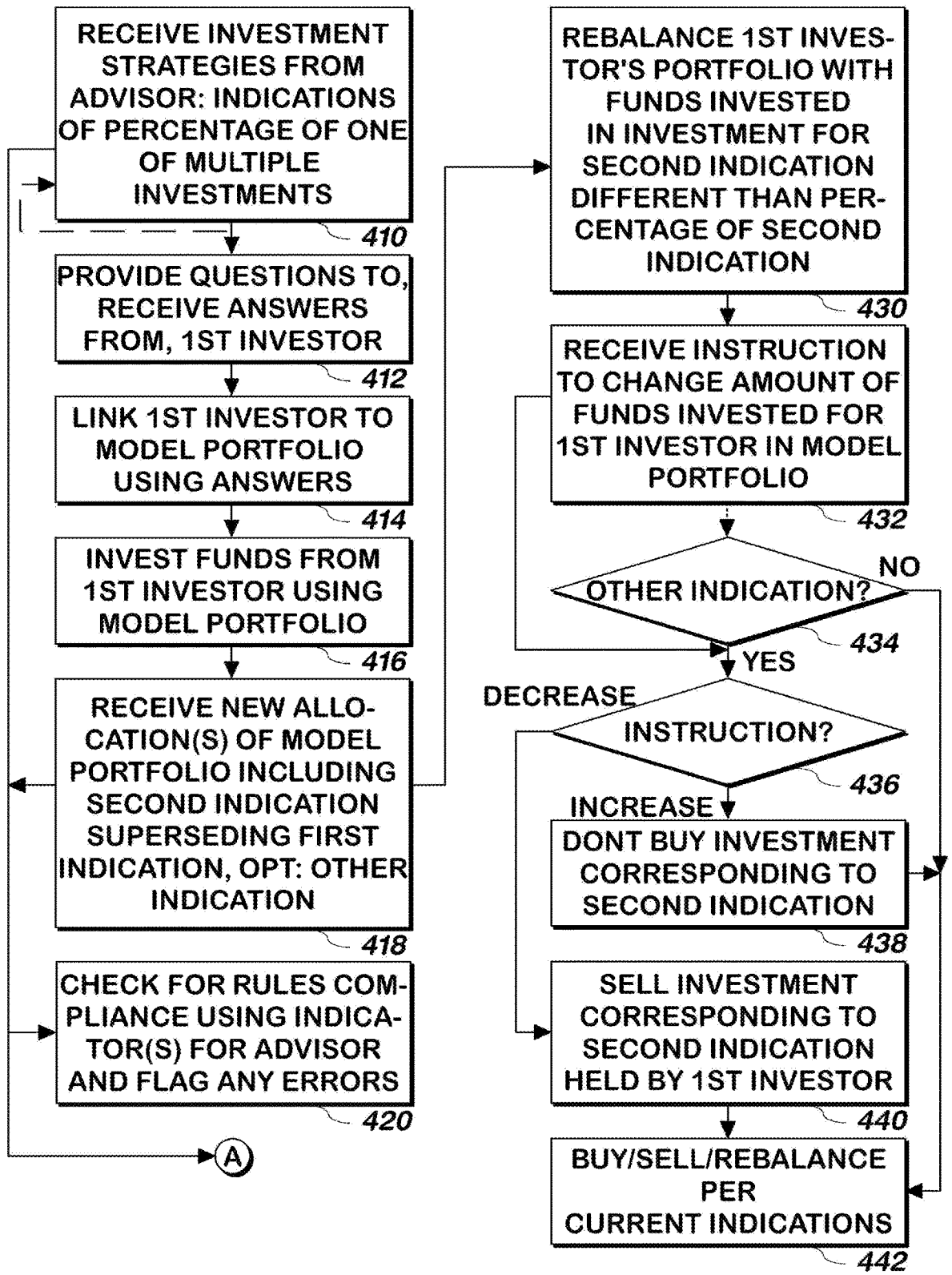
FIG. 4, consisting of FIG. 4A
FIG. 4B is a flowchart illustrating a sample operation of investing for one or more investors according to one embodiment of the present invention.

FIG. 4, consisting of FIG. 4A and FIG. 4B is a flowchart illustrating a sample operation of investing for one or more investors according to one embodiment of the present invention.

Referring now to FIG. 4, there may be performed a method of managing two or more investments for two or more investors, the method including:

receiving, during a first period, from an investment advisor who is different from the two or more investors two or more investment strategies, each investment strategy in the plurality including two or more model portfolios, each of the model portfolios in the plurality including two or more first indications, each indicating a percentage of that model portfolio that should be allocated to each of at least one of the two or more investments 410;

receiving during a second period after the first period, from an investor in the plurality, answers to two or more questions 412;

linking said investor to a model portfolio of a strategy, responsive to the answers received 414;

investing, during a third period after the second period, funds of the investor responsive to the two or more first indications in the model portfolio to which the investor was linked 416;

receiving, during a fourth period after the third period, a second indication of a different percentage of the model portfolio linked to the investor that should be allocated to at least one of the two or more investments, the second indication lower than a corresponding one of the two or more first indications and superseding one of the first indications for any of the investors in the plurality for which funds of such investors have been invested in said model portfolio 418;

rebalancing for the investor during a fifth period after the fourth period, the investments corresponding to the first indications of the model portfolio, the rebalancing responsive to at least some of the two or more first indications, so that an invested percentage of the funds invested for the investor allocated to the at least one investment corresponding to the second indication is different from the different percentage of the second indication after said rebalancing 430; and receiving, during a sixth period after the fourth period, an instruction to change the amount of the funds invested by the investor in the portfolio linked to the investor 432:

responsive to the instruction including an increase in the funds to be invested for the investor 436, not purchasing for the investor the at least one investment corresponding to the second indication 438; and responsive to the instruction including a decrease in funds to be invested for the investor 436, selling a portion of the investment corresponding to the second indication that is held by the investor 440.

The method may include an optional feature whereby the rebalancing, not purchasing, and selling steps are responsive to, or additionally responsive to, an other indication affirmatively received from the advisor 418 that indicates such steps should be performed in such manner, and otherwise buying or selling or rebalancing according to the current indications for the model portfolio 434.

The method may include an optional feature of rebalancing for the investor during the fifth period the investments of the model portfolio so that the investment corresponding to the second indication is not different from the different percentage of the second indication after said rebalancing, responsive to the other indication not being received from the advisor 442.

The method may include an optional feature whereby, of the two or more first indications, each indicates the percentage of the model portfolio that should be allocated to one of a specified two of the two or more investments 410.

The method may additionally include:

receiving during a seventh period after the first period, information, from an other investor in the plurality or from the investment advisor, to link the other investor to an other model portfolio of a strategy 450;

linking the other investor to the other model portfolio responsive to the information 452; and investing, during an eighth period after the second period, funds of the other investor responsive to the other model portfolio to which the other investor was linked 454.

The method may additionally include:

checking each investment strategy received against a set of rules, responsive to an indicator of whether the rules should or should not be enforced 420; and providing an error responsive to the checking 420.

A system for managing two or more investments for two or more investors may include the following:

at least one allocation manager, each allocation manager having an input for receiving, during a first period, from an investment advisor who is different from the two or more investors two or more investment strategies, each investment strategy in the plurality including two or more model portfolios, each of the model portfolios in the plurality including two or more first indications, each indicating a percentage of that model portfolio that should be allocated to each of at least one of the two or more investments, each allocation manager for providing at an output the two or more first indications for each investment strategy;

an investment assignment manager having an input for receiving during a second period after the first period, from an investor in the plurality, two or more answers to two or more questions, the investment assignment manager for linking said investor to a model portfolio of a strategy, responsive to the two or more answers received, and for providing at an output, an identifier of the model portfolio linked to the investor; and an investment manager having an input coupled to each of the at least one allocation manager output for receiving the two or more first indications for each investment strategy, and to the investment assignment manager output for receiving the identifier of the model portfolio linked to the investor, the investment manager for investing via an input/output, during a third period after the second period, funds of the investor responsive to the two or more first indications in the model portfolio to which the investor was linked; and wherein:

the at least one allocation manager additionally for receiving via the allocation manager input, during a fourth period after the third period, a second indication of a different percentage of the model portfolio linked to the investor that should be allocated to at least one of the two or more investments, the second indication lower than a corresponding one of the two or more first indications and superseding one of the first indications for any of the investors in the plurality for which funds of such investors have been invested in said model portfolio, and the at least one allocation manager additionally for providing at its respective allocation manager output, the at least one second indication;

the investment manager input is additionally for receiving the second indication, and the investment manager is additionally for rebalancing via the investment manager input/output, for the investor during a fifth period after the fourth period, the investments corresponding to the first indications of the model portfolio, the rebalancing responsive to at least some of the two or more first indications, so that an invested percentage of the funds invested for the investor allocated to the at least one investment corresponding to the second indication is different from the different percentage of the second indication after said rebalancing;

the investment manager input is additionally for receiving, during a sixth period after the fourth period, an instruction to change the amount of the funds invested by the investor in the portfolio linked to the investor; and the investment manager is additionally for:

responsive to the instruction including an increase in the funds to be invested for the investor, not purchasing for the investor the at least one investment corresponding to the second indication; and responsive to the instruction including a decrease in funds to be invested for the investor, selling via the investment manager input/output a portion of the investment corresponding to the second indication that is held by the investor.

The system may include an optional feature whereby:

at least one of the at least one allocation manager is additionally for receiving from the advisor an other indication having a first state and a second state, the first state indicating the rebalancing, not purchasing and selling functions are to be performed in the aforesaid manner, and said at least one of the at least one allocation manager is for providing at the allocation manager output the other indication received;

the investment manager input is additionally for receiving the other indication, and the investment manager the rebalances, does not purchase, and sells responsive to, or additionally responsive to the other indication having the first state.

The system may include an optional feature whereby, the investment manager is additionally for rebalancing for the investor during the fifth period the investments of the model portfolio so that the investment corresponding to the second indication is not different from the different percentage of the second indication after said rebalancing, responsive to the other indication having the second state.

The system may include an optional feature whereby, of the two or more first indications, each indicates the percentage of the model portfolio that should be allocated to one of a specified two of the two or more investments.

The system may include an optional feature whereby:

the investor assignment manager is additionally for receiving during a seventh period after the first period, two or more other answers to each of the two or more questions, from an other investor in the plurality, which the investor assignment manager uses to link the other investor to an other model portfolio of a strategy and to provide an identifier of the other model portfolio at the investor assignment manager output; and the investment manager is additionally for investing, during an eighth period after the second period, via the investment manager input/output funds of the other investor responsive to the other model portfolio to which the other investor was linked.

The system may additionally include an allocation check manager having an input coupled to receive at least one indication as to whether one or more rules should be enforced and to the output of each of the at least one allocation manager for receiving the two or more first indications for each investment strategy, the allocation check manager for checking each investment strategy received against a set of rules, responsive to an at least one indication as to whether the rules should or should not be enforced, and for providing an error at an output responsive to the checking.

The system and method may be implemented as a computer program product including a non-transitory computer useable medium having computer readable program code embodied therein for managing two or more investments for two or more investors, the computer program product including computer readable program code devices configured to cause a computer system to:

receive, during a first period, from an investment advisor who is different from the two or more investors two or more investment strategies, each investment strategy in the plurality including two or more model portfolios, each of the model portfolios in the plurality including two or more first indications, each indicating a percentage of that model portfolio that should be allocated to each of at least one of the two or more investments;

receive during a second period after the first period, from an investor in the plurality, answers to two or more questions;

link said investor to a model portfolio of a strategy, responsive to the answers received;

invest, during a third period after the second period, funds of the investor responsive to the two or more first indications in the model portfolio to which the investor was linked;

receive, during a fourth period after the third period, a second indication of a different percentage of the model portfolio linked to the investor that should be allocated to at least one of the two or more investments, the second indication lower than a corresponding one of the two or more first indications and superseding one of the first indications for any of the investors in the plurality for which funds of such investors have been invested in said model portfolio;

rebalance for the investor during a fifth period after the fourth period, the investments corresponding to the first indications of the model portfolio, the rebalancing responsive to at least some of the two or more first indications, so that an invested percentage of the funds invested for the investor allocated to the at least one investment corresponding to the second indication is different from the different percentage of the second indication after said rebalancing; and receive, during a sixth period after the fourth period, an instruction to change the amount of the funds invested by the investor in the portfolio linked to the investor:

responsive to the instruction including an increase in the funds to be invested for the investor, not purchase for the investor the at least one investment corresponding to the second indication; and responsive to the instruction including a decrease in funds to be invested for the investor, sell a portion of the investment corresponding to the second indication that is held by the investor.

The computer program product may include an optional feature whereby the computer program product including computer readable program code devices configured to cause the computer system to rebalance, not purchase, and sell are responsive to, or additionally responsive to, an other indication affirmatively received from the advisor that indicates such steps should be performed in such manner.

The computer program product may additionally include computer program product including computer readable program code devices configured to cause the computer system to rebalance for the investor during the fifth period the investments of the model portfolio so that the investment corresponding to the second indication is not different from the different percentage of the second indication after said rebalancing, responsive to the other indication not being received from the advisor.

The computer program product may include an optional feature whereby, of the two or more first indications, each indicates the percentage of the model portfolio that should be allocated to one of a specified two of the two or more investments.

The computer program product may additionally include computer program product including computer readable program code devices configured to cause the computer system to:

receive during a seventh period after the first period, information, from an other investor in the plurality or from the investment advisor, to link the other investor to an other model portfolio of a strategy;

link the other investor to the other model portfolio responsive to the information; and invest, during an eighth period after the second period, funds of the other investor responsive to the other model portfolio to which the other investor was linked.

The computer program product may additionally include computer program product including computer readable program code devices configured to cause the computer system to:

check each investment strategy received against a set of rules, responsive to an indicator of whether the rules should or should not be enforced; and provide an error responsive to the checking.

What is claimed is:

1. A computer-implemented method of managing a plurality of investments for a plurality of investors on a computer system that maintains investor accounts, comprising:

receiving, by the computer system, during a first period, from each of a plurality of investment advisors, each of whom is different from the plurality of investors, a plurality of investment strategies, each investment strategy of the plurality of investment strategies comprising a plurality of model portfolios, each model portfolio of the plurality of model portfolios comprising a plurality of first indications, each of the plurality of first indications indicating a percentage of the model portfolio to be allocated to an investment of the plurality of investments;

receiving, by the computer system during a second period after the first period, from each of the plurality of investors, a selection of one of the plurality of investment advisors and answers to a plurality of questions;

linking, by the computer system, each of the plurality of investors to a model portfolio of an investment strategy of one of the plurality of investment advisors, responsive to the answers received and the selection of each of the plurality of investors;

investing, by the computer system during a third period after the second period, funds of each of the plurality of investors responsive to the plurality of first indications in the model portfolio to which each of the plurality of investors is linked;

receiving, by the computer system, from one of the plurality of investment advisors during a fourth period after the third period, a second indication indicating an updated percentage of one of the investments of the plurality of investments of a model portfolio of the one of the plurality of investment advisors, the second indication superseding one of the plurality of first indications of the model portfolio of the one of the plurality of investment advisors;

rebalancing, by the computer system during a fifth period after the fourth period, the investments of a subset of the investors of the plurality of investors, the rebalancing including adjusting allocations of investments of the plurality of investments of the subset of investors to align with the plurality of first indications and the second indication of the model portfolio linked to each investor of the subset of investors, the subset of investors of the plurality of investors being investors whose investments are not aligned with at least one of the plurality of first indications and the second indication prior to the rebalancing; and receiving at the computer system, during a sixth period after the fourth period, an instruction to change an amount of the funds invested by an investor:

responsive to the instruction comprising an increase in the funds to be invested for the investor, purchasing for the investor investments aligned with the plurality of first indications and the second indication of the model portfolio linked to the investor; and responsive to the instruction comprising a decrease in funds to be invested for the investor, selling a portion of at least one investment to maintain alignment with the plurality of first indications and the second indication of the model portfolio linked to the investor via a Transmission Control Protocol/Internet Protocol-compatible communication interface.

2. The method of claim 1, wherein at least one of the rebalancing, the purchasing, or the selling is responsive to an instruction received by the computer system from an investment advisor of the plurality of investment advisors.

3. The method of claim 1, wherein the rebalancing excludes investments corresponding to the second indication when the investments corresponding to the second indication are designated as other investments.

4. The method of claim 1, wherein of the plurality of first indications, each indicates the percentage of the model portfolio that is to be allocated to one of a specified investment of the plurality of investments.

5. The method of claim 1, additionally comprising:
checking each investment strategy received against a set of rules, responsive to an indicator of whether the rules are or are not to be enforced; and
providing an error responsive to the checking.

6. The method of claim 1, further comprising:
periodically analyzing, with the computer system, the investments of each of the plurality of investors to determine if the investments are aligned with each of the plurality of first indications and the second indication.

7. The method of claim 6, wherein the rebalancing occurs after the periodically analyzing for each investor of the plurality of investors whose investments are not aligned with each of the plurality of first indications and the second indication.

8. The method of claim 1, further comprising:
periodically analyzing, with the computer system, the investments of each of the plurality of investors to determine if tax loss harvesting may be performed; and
performing, with the computer system, tax loss harvesting on each of the investments of each of the plurality of investors that qualify for tax loss harvesting.

9. A computer system for managing a plurality of investments for a plurality of investors, comprising:
an investor registration manager comprising a hardware processor coupled to a computer memory for maintaining information for investor accounts;
at least one allocation manager comprising the hardware processor coupled to the computer memory, each allocation manager having an input for receiving, during a first period, from each of a plurality of investment advisors, each of whom is different from the plurality of investors, a plurality of investment strategies, each investment strategy of the plurality of investment strategies comprising a plurality of model portfolios, each model portfolio of the plurality of model portfolios comprising a plurality of first indications, each of the plurality of first indications indicating a percentage of the model portfolio to be allocated to an investment of the plurality of investments, each allocation manager for providing at an output the plurality of first indications for each model portfolio of each investment strategy;
an investment assignment manager comprising the hardware processor coupled to the computer memory and having an input for receiving during a second period after the first period, from each investor of the plurality of investors, a selection of one of the plurality of investment advisors and a plurality of answers to a plurality of questions, the investment assignment manager for linking each of the plurality of investors to a model portfolio of an investment strategy of one of the plurality of investment advisors responsive to the plurality of answers received and the selection of each of the plurality of investors, and for providing at an output, an identifier of the model portfolio linked to each of the plurality of investors; and
an investment manager comprising the hardware processor coupled to the computer memory and having an input coupled to each of the at least one allocation manager output for receiving the plurality of first indications for each model portfolio of each investment strategy, and to the investment assignment manager output for receiving the identifier of the model portfolio linked to each of the plurality of investors, the investment manager for investing via an investment manager input and an investment manager output, during a third period after the second period, funds of each of the plurality of investors responsive to the plurality of first indications in the model portfolio to which each of the plurality of investors is linked; and
wherein:
the at least one allocation manager is additionally for receiving from one of the plurality of investment advisors via the allocation manager input, during a fourth period after the third period, a second indication indicating an updated percentage of one of the investments of the plurality of investments of a model portfolio of the one of the plurality of investment advisors, the second indication superseding one of the plurality of first indications of the model portfolio of the one of the plurality of investment advisors, and the at least one allocation manager additionally for providing at its respective allocation manager output, the second indication;
the investment manager input is additionally for receiving the second indication, and the investment manager is additionally for rebalancing via the investment manager input and the investment manager output, for the investor during a fifth period after the fourth period, the investments of a subset of the investors of the plurality of investors, the rebalancing including adjusting allocations of investments of the plurality of investments of the subset of investors to align with the plurality of first indications and the second indication of the model portfolio linked to each investor of the subset of investors, the subset of investors of the plurality of investors being investors whose investments are not aligned with at least one of the plurality of first indications and the second indication prior to the rebalancing;
the investment manager input is additionally for receiving, during a sixth period after the fourth period, an instruction to change an amount of the funds invested by an investor;
and the investment manager is additionally for
responsive to the instruction comprising an increase in the funds to be invested for the investor, purchasing for the investor investments aligned with the plurality of first indications and the second indication of the model portfolio linked to the investor; and
responsive to the instruction comprising a decrease in funds to be invested for the investor, selling, via the investment manager input and the investor manager output coupled to a Transmission Control Protocol/Internet Protocol-compatible communication interface, a portion of at least one investment to maintain alignment with the plurality of first indications and the second indication of the model portfolio linked to the investor.

10. The system of claim 9, wherein:
at least one of the at least one allocation manager is additionally for receiving from an advisor an instruction to perform at least one of the rebalancing, the purchasing, or the selling, and said at least one of the at least one allocation manager is for providing at the allocation manager output the instruction received; and
the investment manager input is additionally for receiving the instruction, and the investment manager performs at least one of the rebalancing, the purchasing, or the selling responsive to the instruction.

11. The system of claim 9, wherein the rebalancing excludes investments corresponding to the second indication when the investments corresponding to the second indication are designated as other investments.

12. The system of claim 9, wherein of the plurality of first indications, each indicates the percentage of the model portfolio that are to be allocated to one of a specified investment of the plurality of investments.

13. The system of claim 9, additionally comprising:
an allocation check manager having an input configured to receive at least one indication as to whether one or more rules are to be enforced and to couple to the output of each of the at least one allocation manager for receiving the plurality of first indications for each model portfolio of each investment strategy, the allocation check manager configured to check each investment strategy received against a set of rules, responsive to an at least one indication as to whether the rules are or are not to be enforced, and to provide an error at an output responsive to the checking.

14. A computer program product comprising a non-transitory computer useable medium having computer readable program code embodied therein for managing a plurality of investments for a plurality of investors, the computer program product comprising computer readable program code devices configured to cause a computer system that maintains investor accounts to:
receive, during a first period, from each of a plurality of investment advisors, each of whom is different from the plurality of investors, a plurality of investment strategies, each investment strategy of the plurality of investment strategies comprising a plurality of model portfolios, each model portfolio of the plurality of model portfolios comprising a plurality of first indications, each of the plurality of first indications indicating a percentage of the model portfolio to be allocated to an investment of the plurality of investments;
receive during a second period after the first period, from each investor of the plurality of investors, a selection of one of the plurality of investment advisors and answers to a plurality of questions;
link each of the plurality of investors to a model portfolio of an investment strategy of one of the plurality of investment advisors, responsive to the answers received and the selection of each of the plurality of investors;
invest, during a third period after the second period, funds of each of the plurality of investors responsive to the plurality of first indications in the model portfolio to which each of the plurality of investors is linked;
receive, from one of the plurality of investment advisors during a fourth period after the third period, a second indication indicating an updated percentage of one of the investments of the plurality of investments of a model portfolio of the one of the plurality of investment advisors, the second indication superseding one of the plurality of first indications of the model portfolio of the one of the plurality of investment advisors;
rebalance during a fifth period after the fourth period, the investments of a subset of the investors of the plurality of investors, the rebalancing including adjusting allocations of investments of the plurality of investments of the subset of investors to align with the plurality of first indications and the second indication of the model portfolio linked to each investor of the subset of investors, the subset of investors of the plurality of investors being investors whose investments are not aligned with at least one of the plurality of first indications and the second indication prior to the rebalancing; and
receive, during a sixth period after the fourth period, an instruction to change an amount of the funds invested by an investor,
responsive to the instruction comprising an increase in the funds to be invested for the investor, purchase for the investor investments aligned with the plurality of first indications and the second indication of the model portfolio linked to the investor; and
responsive to the instruction comprising a decrease in funds to be invested for the investor, sell a portion of at least one investment to maintain alignment with the plurality of first indications and the second indication of the model portfolio linked to the investor via a Transmission Control Protocol/Internet Protocol-compatible communication interface.

15. The computer program product of claim 14, wherein the computer program product comprising computer readable program code devices configured to cause the computer system to rebalance, purchase, and sell are responsive to, or additionally responsive to an instruction received by the computer system from an investment advisor of the plurality of investment advisors.

16. The computer program product of claim 15, wherein the rebalancing excludes investments corresponding to the second indication when the investments corresponding to the second indication are designated as other investments.

17. The computer program product of claim 14, wherein of the plurality of first indications, each indicates the percentage of the model portfolio that is to be allocated to one of a specified investment of the plurality of investments.

18. The computer program product of claim 14, additionally comprising computer program product comprising computer readable program code devices configured to cause the computer system to:
check each investment strategy received against a set of rules, responsive to an indicator of whether the rules are or are not to be enforced; and
provide an error responsive to the checking.

* * * * *